United States Patent [19]

Cortellini

[11] Patent Number: 5,744,413
[45] Date of Patent: *Apr. 28, 1998

[54] CRYOLITE RESISTANT REFRACTORY LINER

[75] Inventor: Edmund A. Cortellini, North Brookfield, Mass.

[73] Assignee: Saint-Gobain/Norton Industrial Ceramics Corporation, Worcester, Mass.

[*] Notice: The term of this patent shall not extend beyond the expiration date of Pat. No. 5,556,817.

[21] Appl. No.: 809,963

[22] PCT Filed: Sep. 25, 1995

[86] PCT No.: PCT/US95/12133

§ 371 Date: Mar. 11, 1997

§ 102(e) Date: Mar. 11, 1997

[87] PCT Pub. No.: WO96/09999

PCT Pub. Date: Apr. 4, 1996

[51] Int. Cl.$^6$ .................................................. C04B 35/185
[52] U.S. Cl. .................... 501/128; 501/143; 501/153; 501/154; 106/692
[58] Field of Search .................................. 501/128, 143, 501/153, 154; 106/692

[56] References Cited

U.S. PATENT DOCUMENTS 4,615,953 10/1986 Ichikawa et al. ................... 106/38.17
5,556,817 9/1996 Cortellini ............................. 501/153

Primary Examiner—Paul Marcantoni
Attorney, Agent, or Firm—Thomas M. DiMauro

[57] ABSTRACT

This invention relates to a Hall-Heroult cell for aluminum production comprising a cryolite-resistant liner comprising:
i) between 75 weight percent wt % and 95 wt % alumina-silica refractory grain, and
ii) between 1 wt % and 10 wt % of a sealant selected from the group consisting of feldspar and nepheline.

16 Claims, No Drawings

CRYOLITE RESISTANT REFRACTORY LINER

BACKGROUND OF THE INVENTION

Conventional virgin aluminum production typically involves the reduction of alumina which has been dissolved in a cryolite-containing electrolyte. The reduction is carried out in a Hall-Heroult cell containing a carbon anode and a carbon cathode which also serves as a container for the electrolyte. When current is run through the electrolyte, liquid aluminum is deposited at the cathode while gaseous oxygen is produced at the anode. Because the heat flux of the cell must be strictly maintained, insulating materials, such as dense firebrick, are used under the carbon cathode container.

Although cryolite is quite useful in dissolving alumina, it nonetheless compromises the long term life of the cell. Upon electrolysis, the cryolite ionizes into highly reactive species, in particular, sodium and fluorine ions and aluminum radicals. Over time, these species pass through the carbon cathode containment and contact the firebrick. Upon contact, the species attack the firebrick and gradually degrade its physical integrity to the point where the firebrick must be replaced.

Previous attempts to solve this problem have met with mixed success. Vapor barriers such as steel sheets have been placed between the cathode and the firebrick. However, these sheets are eventually consumed by the cryolite and produce contamination. Glass sheets have been similarly placed in an attempt to produce a viscous liquid barrier between the cathode and the firebrick, with similar results. Other efforts have used castables and dry vibrated cements ("DVC") such as mullite as the protective barrier. Although these materials react with the cryolite to produce a relatively stable assemblage, the silica and alumina contained therein are highly susceptible to attack from the ionized cryolite species.

One effort to improve upon high alumina castable barriers, U.S. Pat. No. 4,126,474, added barium to the castable. Although this effort improved cryolite resistance, barium is a heavy metal and so carries with it environmental concerns.

DE 4128963 discloses a fluorine-resistant refractory material comprising lime particularly suited for use as a lining in aluminum production vessels.

U.S. Pat. No. 5,389,583 and corresponding EP 0 464 757 A1 disclose a novel ceramic composition suitable for use as an electrical refractory wherein the improvement concerns at least partial replacement of a feldspar component. Each of the examples disclosed in U.S. Pat. No. 5,389,583 requires at least 10% clay.

JP-A-57129880 discloses refractories having graphite, clay and 5-15% potash feldspar, which are used as linings for materials which contact high temperature molten metals.

Accordingly, it is the object of the present invention to provide a dry vibrated cement ("DVC") or castable refractory which offers superior resistance to cryolite penetration without posing environmental concerns.

SUMMARY OF THE INVENTION

In accordance with the present invention, there is provided a Hall-Heroult cell for aluminum production comprising a cryolite-resistant liner comprising:
  i) between 75 wt % and 95 wt % alumina-silica refractory grain, and
  ii) between 1 wt % and 10 wt % of a sealant selected from the group consisting of feldspar and nepheline.

Also in accordance with the present invention, there is provided a cryolite-resistant refractory composition consisting of:
  i) between 75 wt % and 95 wt % alumina-silica refractory grain,
  ii) between 1 wt % and 10 wt % of a sealant selected from the group consisting of feldspar and nepheline, and
  iii) inorganic cementitious binder.

DETAILED DESCRIPTION OF THE PRESENT INVENTION

It has been unexpectedly found that small amounts of feldspar and/or nepheline impart the necessary bonding, sealing, penetration resistance and erosion resistance to alumina-silica cement mixtures (e.g., a mullite-based cement) to provide a cryolite-resistant refractory product more capable of withstanding the rigorous conditions of the aluminum reduction cell.

Without wishing to be tied to a theory, it is believed that the sealant increases resistance to cryolite penetration in two ways. First, at typical operating temperatures, the sealant forms a viscous glass which seals the pores of the alumina-silica refractory from cryolite penetration. It is believed the large ionic radii of the cations in the alkali- and alkaline earth-based sealants increase the viscosity of the liquid at the cryolite/refractory interface, thereby making a thin semipermeable film between the refractory's pores and the corrosive components of the reduction cell (e.g., cryolite). Second, the glass also bonds together the refractory grains to reduce erosion.

However, the desirability of increasing the sealant concentration in the barrier is limited by the sealant's less attractive characteristics, namely reactivity and refractoriness. Hence, it is contemplated that selection of the proper sealant concentration depends upon a delicate balance between the refractoriness, reactivity, and viscosity of the sealant.

Adding sealants to alumina-silica refractories poses the danger that the refractory and the sealant will react with one another to form new, less cryolite-resistant compounds. Accordingly, the sealant should have a low chemical reactivity towards the refractory. In this respect, feldspar is highly advantageous because it does not react with mullites to form new compounds. Moreover, the other compounds present in the cell in significant amounts (e.g., sodium, aluminum and silica) are also the constituents of feldspar. Therefore, feldspar will not react with any of the predominant compounds in the furnace.

Because the sealants contemplated for use in the present invention are typically less refractory than alumina-silica refractories, their inclusion in the alumina-silica based cements lowers the overall refractoriness of those cements. Thus, the concentration of sealant should be selected to provide a seal for the refractory barrier against the cryolite without significantly lowering the refractoriness of the barrier.

Experiments have shown that adding between 2 wt % and 10 wt % of either nepheline or feldspar to the alumina-silica cements provides the desired bonding, sealing, erosion and penetration resistance.

In preferred embodiments of the present invention, the sealant is feldspar. When feldspar is used, it generally comprises between 1 wt % and 10 wt % of the cement, preferably between 1.5 wt % and 6 wt %. It has been found that resistance to cryolite penetration typically increases with feldspar concentration up to 6 wt % feldspar. From 6 wt % to 10 wt % feldspar, resistance is apparently maintained or slightly degraded. Preferably, the feldspar grains are −200 US mesh, i.e., less than 75 microns. Also, between 1.5 wt % and 4 wt % of alumina and/or silica may be added to the sealant composition.

In other embodiments, nepheline (($Na,K)AlSiO_4$), is used as the sealant. However, although nepheline addition does create a viscous glass (thereby increasing cryolite resistance), it does not do so as well as feldspar.

In general, the sealants of both the DVC and cast embodiments of the present invention are present in a grain size finer than 150 mesh (less than 106 micrometers (microns)), preferably finer than 325 mesh (less than 45 micrometers (microns)). In preferred embodiments utilizing feldspar, the feldspar is less than 200 mesh (less than 75 micrometers (microns)).

Some of the castables containing sealants other than feldspar or nepheline exhibited acceptable chemical resistance but either unacceptable behavior in water or unacceptably large shrinkage during firing. For example, zinc borate was examined as a sealant but exhibited a high solubility which adversely affected the flow and set of the castable. Further, castables containing at least 6 wt % of either gypsum ($CaSO_4:2H_2O$), calcium carbonate or calcium hydroxide (($Ca(OH)_2$)) experienced volume changes upon firing significant enough to produce excessive cracking. Finally, mixes containing one of $Ca(OH)_2$, $CaSO_4:2H_2O$ and zinc borate as sealants required unacceptably high amounts of water (i.e., more than 9 wt %) to achieve sufficient flowability, and so were prone to unacceptably high porosity and shrinkage upon firing.

The alumina-silica refractory component of the present invention should provide acceptable insulation for the firebrick while maintaining cryolite resistance. It may include compounds such as mullite, pyrophyllite, calcined fireclay or kaolin, calcined bauxite, calcined alumina, and tabular or fused alumina. Preferably, alumina comprises between 30 wt % and 90 wt %, more preferably between 60 wt % and 85 wt % of the cement, while silica comprises between 10 wt % and 60 wt %, more preferably between 15 wt % and 40 wt % of the cement. In preferred embodiments, this fraction is a calcined mullite ($3Al_2O_3:2SiO_2$) grain and comprises between 75 wt % and 95 wt % of the cement. In more preferred embodiments, Mulcoa 47, Mulcoa 60 or Mulcoa 70, each available from Combustion Engineering of Windsor Locks, Conn. is used as the refractory grain. Because the alumina-silica refractory component predominates the present invention, its grain size distribution should provide a tight, dense packing. Preferably, all of the alumina-silica grains pass through a 4 mesh screen, with at least 12 wt % less than 325 mesh (44 micrometers (microns)).

It has also been found that when the alumina content of the alumina-silica fines is increased by 5 wt % alumina, cryolite resistance of the resultant barrier is increased. It is believed the increased resistance of this embodiment is due to the formation of feldspathoids. Feldspathoids are believed to be more resistant to cryolite penetration than feldspar.

In the castable embodiments of the present invention, water typically comprises between 5.5 wt % and 7.5 wt % of the castable, based upon the weight of the dry castable. The lower regions of this range are used when the selected alumina-silica grains have low porosity, while the upper regions are used when the selected alumina-silica grains have high porosity. However, other parameters such as temperature, humidity, dry mix moisture, mixing intensity, grain surface area variability and grain shape also affect the optimum percentage. Because higher amounts of water increase the porosity of the cast body (which in turn increases the expected shrinkage and pore size of the final refractory), wetting agents and fumed silica can be added to enhance castability and so reduce water content. Typical wetting agents include sodium or potassium pyrophosphates, orthophosphates or metaphosphates; sodium or potassium silicates; and lignosulfonates.

The cement of the present invention typically has an inorganic cementitious binder fraction which serves to bond the refractory grains together. This binder fraction may include calcium aluminate, other suitable calcium/aluminum compounds, hydraulic binders, fondue cement, and phosphate-containing binders such as monoaluminum phosphates, and mixtures thereof. The binder is usually present in amounts of between 2 and 10 wt % of the cement, preferably between 4 wt % and 8 wt %. Typically, the cementitious binders are sized so that at least 80% is less than 44 micrometers (microns). In preferred embodiments, calcium aluminate is used as the binder in an amount of between 2 and 10 wt % of the cement.

The starting materials for both the DVC and castable embodiments of the present invention are usually initially processed in the same manner. Typically, the desired concentrations of the selected components are loaded into a mixer which mixes the components until the charge is completely homogenized.

In some embodiments of the present invention in which a DVC is installed in either the bottom of a Hall cell or atop insulating brick, the cement components set out below in TABLE I are mixed until homogeneous.

TABLE I

| CONSTITUENT | GENERAL RANGE | PREFERRED RANGE |
| --- | --- | --- |
| Mulcoa 47 4 × 8 | 28–30 wt % | 29 wt % |
| Mulcoa 47 8 × 20 | 23–27 | 25 |
| Mulcoa 47 20F | 13–17 | 15 |
| Mulcoa 47 48M | 10–12 | 11 |
| Mulcoa 47 200M | 01–10 | 5 |
| Fine reactive alumina | 0–6 | 5 |
| Flint −200M | 0–3 | 0 |
| Kyanite −200M | 0–6 | 4 |
| Sealing Additive | 1.5–10 | — |
| feldspar | 1.5–10 | 6 |
| nepheline | 3–10 | 0 |

The selected mixture is placed on the bottom of the cell, the depth of the loose material being limited to between 5.08 cm (2 inches) and 15.24 cm (6 inches). The mixture is then forked to promote both deairing and densification (packing). Next, a conventional surface vibrator (Bosch type) or vibrating sled contacts the mix, promoting further densification. After the surface of this densified DVC is scratched, another load of the homogenized mixture is poured onto the surface, deaired and vibrated. This procedure is repeated until the desired depth of the refractory is attained.

In another DVC embodiment, a single large load of the homogenized mixture is placed in the cell and the entire cell is vibrated until the charge packs down to the desired depth.

In another DVC embodiment, the three coarsest fractions of the Mulcoa 47 grains are replaced with Mulcoa 70 grains.

In an embodiment of the present invention in which a castable is installed, the cement components set out in TABLE II below are mixed until homogeneous. (The notations "4×8", "8×20", "20F" and "200M" refer to standard mesh sizes).

TABLE II

| CONSTITUENT | GENERAL RANGE | PREFERRED RANGE |
|---|---|---|
| Mulcoa 47 4 × 8 | 47–50 wt % | 48 wt % |
| Mulcoa 47 8 × 20 | 05–10 | 7 |
| Mulcoa 47 20F | 05–10 | 7 |
| Mulcoa 47 200M | 15–28 | 17 |
| Fine reactive alumina | 00–06 | 5.15 |
| Kyanite –200M | 00–04 | 0 |
| CaAl cement | 02–10 | 5 |
| Silica fume | 03–05 | 4.8 |
| Wetting agent | 0.01–0.5 | 0.05 |
| Sealing Additive | 1.5–10 | — |
| feldspar | 1.5–10 | 6 |
| nepheline | 3–10 | |

The homogenized mixture is placed into a suitable mixer, preferably a paddle type mixer whose blades rotate through the mixture (as opposed to the tumbling action found in conventional mortar-type mixers). Next, a preselected amount of water is added to the mixer during mixing. When the water and mixture become homogeneous, the castable is removed from the mixer and placed into the cell. At this time, the castable is vibrated with a vibrator, preferably either a form, immersion or pencil vibrator. If the amount of castable placed in the cell is found to be insufficient, additional castable should be added as quickly as possible to insure against stratification in the final product.

In another castable embodiment, the three coarsest fractions of the Mulcoa 47 grains are replaced with Mulcoa 70 grains.

The present invention may be used in any application generally suitable for refractories, including DVC's, castables, ramming mixes, bricks and mortars. Preferably, it is used as a liner in an aluminum production reaction chamber.

EXAMPLE I

Castable and DVC mixtures comprising the constituents set out in TABLE III below along with typical additives set out in TABLES I and II were selected for penetration and erosion testing. Castable mixes are designated as "C" while DVC mixes are designated as "D". The sealant fraction is set out in weight percent. "M47" means all of the alumina-silica grains are Mulcoa 47, while "M70" means the three coarsest fractions of the alumina-silica grains are Mulcoa 70.

TABLE III

| Mix | Alumina-Silica | Sealant |
|---|---|---|
| Mix CK | M70 | 3 wt % Barite |
| Mix C1 | M70 | 3 wt % Gypsum |
| Mix C2 | M70 | 3 wt % Whiting |
| Mix C3 | M70 | 3 wt % Ca(OH)$_2$ |
| Mix C4 | M70 | 3 wt % Feldspar |
| Mix C5 | M70 | 6 wt % Feldspar |
| Mix C6 | M47 | 10 wt % Feldspar |
| Mix C7 | M70 | 3 wt % Zinc borate |
| Mix C8 | M70 | 3 wt % C8722 Frit |
| Mix C9 | M70 | 3 wt % Sulfur |
| Mix D1 | M47 | 10 wt % Nepheline-Fumed Silica |
| Mix D2 | M47 | 10 wt % Nepheline-A12 Alumina |
| Mix D3 | M47 | 3 wt % Feldspar |
| Mix D4 | M47 | 6 wt % Feldspar-Fumed Silica |
| Mix D5 | M47 | 6 wt % Feldspar-A12 Alumina |
| Mix D6 | M47 | 10 wt % Feldspar |
| Mix D7 | M70 | 3 wt % Feldspar |

TABLE III-continued

| Mix | Alumina-Silica | Sealant |
|---|---|---|
| Mix D8 | M70 | 6 wt % Feldspar |
| Mix D9 | M70 | 10 wt % Feldspar |
| Mix D10 | M70 | 3 wt % Calcium Aluminate Cement |

For the castable embodiments, 22.86 cm×11.43 cm×6.35 cm (9"×4.5"×2.5") straight bricks were cast with the required amounts of water. The bricks were allowed to cure overnight covered in plastic and then removed from the mold and placed in a hot air dryer to remove the pore water. Samples were then fired at 1500° C.

For the DVC embodiments, 22.86 cm×11.43 cm×6.35 cm (9"×4.5"×2.5") straight bricks were pressed. The dry material was mixed with 3 wt % water and a starch binder and hydraulically pressed on a uniaxial 271,800 kg (300 ton) press so the same density was achieved with a "Bosch" vibrated sample, to simulate actual installed properties. After pressing, the samples were placed in a hot air dryer overnight to dry. The samples were fired to 1500° C.

Next, the castings were core drilled to a 10.16 cm (4 inch) depth and a 2.54 cm (1 inch) diameter to provide a cup capable of containing a cryolite-sodium fluoride liquid.

0.5 grams of quarter inch diameter aluminum pellets were placed into the bottom of the cup. Next, a premixed mixture of 70 wt % cryolite and 30 wt % sodium fluoride was poured and tamped into the cup until it reached a level approximately 0.3175 cm (⅛ inch) from the top of castable. Approximately 80 grams was required to fill the cup. The castable top and open cup area were then covered with a piece of fireclay split brick having the same cross-section dimensions as the castable sample. The samples were then placed in a nitrogen-purged furnace and heated to 950° C. at the rate of 50° C. per hour. The furnace was held at 950° C. for 100 hours before it was shut off. The samples then cooled, while remaining in nitrogen-purged furnace. Once cooled, the samples were removed from the furnace and cut in half transversely through the center of the cup cavity.

Using millimeter rule, the amount of erosion was determined by measuring the extent of lost casting, while the amount of penetration was determined by measuring the extent of casting discoloration. Both measurements were made outward from the cup center to the points of maximum erosion and penetration on either side of the cup cavity. The original cup cavity width (1.0 inch or 25.4 mm) is subtracted to determine the extent of destruction and penetration.

The castings were found to have the following resistances:

| | Erosion (cm) | Penetration (cm) |
|---|---|---|
| Mix CK | 0.559 (0.220 in) | 1.003 (0.395 in) |
| Mix C1 | 0.424 (0.167 in) | 1.008 (0.397 in) |
| Mix C2 | 0.533 (0.21 in) | 1.016 (0.40 in) |
| Mix C3 | 0.533 (0.21 in) | 0.991 (0.399 in) |
| Mix C4 | 0.399 (0.157 in) | 0.864 (0.34 in) |
| Mix C5 | — | 0.780 (0.307 in) |
| Mix C6 | 0.696 (0.274 in) | 0.706 (0.278 in) |
| Mix C7 | 0.508 (0.20 in) | 1.052 (0.414 in) |
| Mix C8 | 0.381 (0.15 in) | 0.940 (0.37 in) |
| Mix C9 | 0.366 (0.144 in) | 1.031 (0.406 in) |
| Mix D1 | 0.744 (0.293 in) | 1.128 (0.444 in) |
| Mix D2 | 0.500 (0.197 in) | 0.851 (0.335 in) |

-continued

|  | Erosion (cm) | Penetration (cm) |
| --- | --- | --- |
| Mix D3 | 0.762 (0.30 in) | 1.120 (0.441 in) |
| Mix D4 | 0.589 (0.232 in) | 0.991 (0.390 in) |
| Mix D5 | 0.714 (0.281 in) | 0.828 (0.326 in) |
| Mix D6 | 0.572 (0.225 in) | 1.001 (0.394 in) |
| Mix D7 | 0.381 (0.15 in) | 0.988 (0.389 in) |
| Mix D8 | 0.406 (0.16 in) | 0.759 (0.299 in) |
| Mix D9 | — | 0.922 (0.363 in) |
| Mix D10 | 0.724 (0.285 in) | 1.186 (0.467 in) |

DVC "D" mixes with whiting, calcium hydroxide, and sulfur were prepared but not tested as samples could not be formed without excessive water for pressing. Each either cracked after firing, or could not be core drilled due to excessive friability. Similarly, castable "C" mixes cast with 6 wt % or more zinc borate, sulfur, whiting, calcium hydroxide and gypsum were prepared but not tested because each either required excessive amounts of water to vibrate, or cracked after firing. However, mixes with 6 wt % and more feldspar cast without any difficulty or increase in water content.

Castable and DVC barriers containing feldspar were also examined by XRD. Within the cup where the molten electrolyte was placed, $Na_5Al_3F_{14}$, $CaF_2$, $Na_3AlF_6$, $a-Al_2O_3$ and glass were detected. In the penetration zone between the molten electrolyte and the refractory, $CaF_2$, $Na_3AlF_6$, $a-Al_2O_3$ and glass were detected. Where no penetration had taken place, $a-Al_2O_3$, $SiO_2$, mullite, kyanite, and glass were detected. There was no significant difference between the DVC and castable with respect to the phase assemblages found.

It is also contemplated that the above listed sealants and especially feldspar, would be useful in imparting similar resistance to nitride bonded-silicon carbide-based refractories.

I claim:

1. A monolithic cryolite-resistant refractory liner for use in aluminum production comprising:
   i) between 75 wt % and 95 wt % alumina-silica refractory grain,
   ii) between 1 wt % and 10 wt % of a sealant selected from the group consisting of feldspar and nepheline.

2. The liner of claim 1 wherein the sealant is feldspar.

3. The liner of claim 2 wherein the feldspar comprises between 1.5 wt % and 6 wt % of the liner.

4. The liner of claim 3 wherein the feldspar is less than 75 micrometers.

5. The liner of claim 3 further comprising between 0.5 wt % and 4 wt % alumina.

6. The liner of claim 3 further comprising between 0.5 wt % and 4 wt % silica.

7. The liner of claim 1 wherein the liner consists essentially of:
   i) between 75 wt % and 95 wt % alumina-silica refractory grain, and
   ii) between 1 wt % and 10 wt % of a sealant selected from the group consisting of feldspar and nepheline, and
   iii) inorganic cementitious binder.

8. A monolithic cryolite-resistant composition consisting essentially of:
   i) between 75 wt % and 95 wt % alumina-silica refractory grain,
   ii) between 1 wt % and 10 wt % of a sealant selected from the group consisting of feldspar and nepheline, and
   iii) inorganic cementitious binder.

9. The composition of claim 8 wherein the sealant is feldspar.

10. The composition of claim 9 wherein the feldspar comprises between 1.5 wt % and 6 wt % of the composition.

11. The composition of claim 10 wherein the feldspar is less than 75 micrometers.

12. The composition of claim 10 further comprising between 0.5 wt % and 4 wt % alumina.

13. The composition of claim 10 further comprising between 0.5 wt % and 4 wt % silica.

14. The composition of claim 10 wherein the alumina-silica refractory contains mullite.

15. The composition of claim 10 wherein the inorganic cementitious binder comprises between 2 and 10 wt % of the composition.

16. The composition of claim 15 wherein the binder is calcium aluminate.

* * * * *